Figure 1:
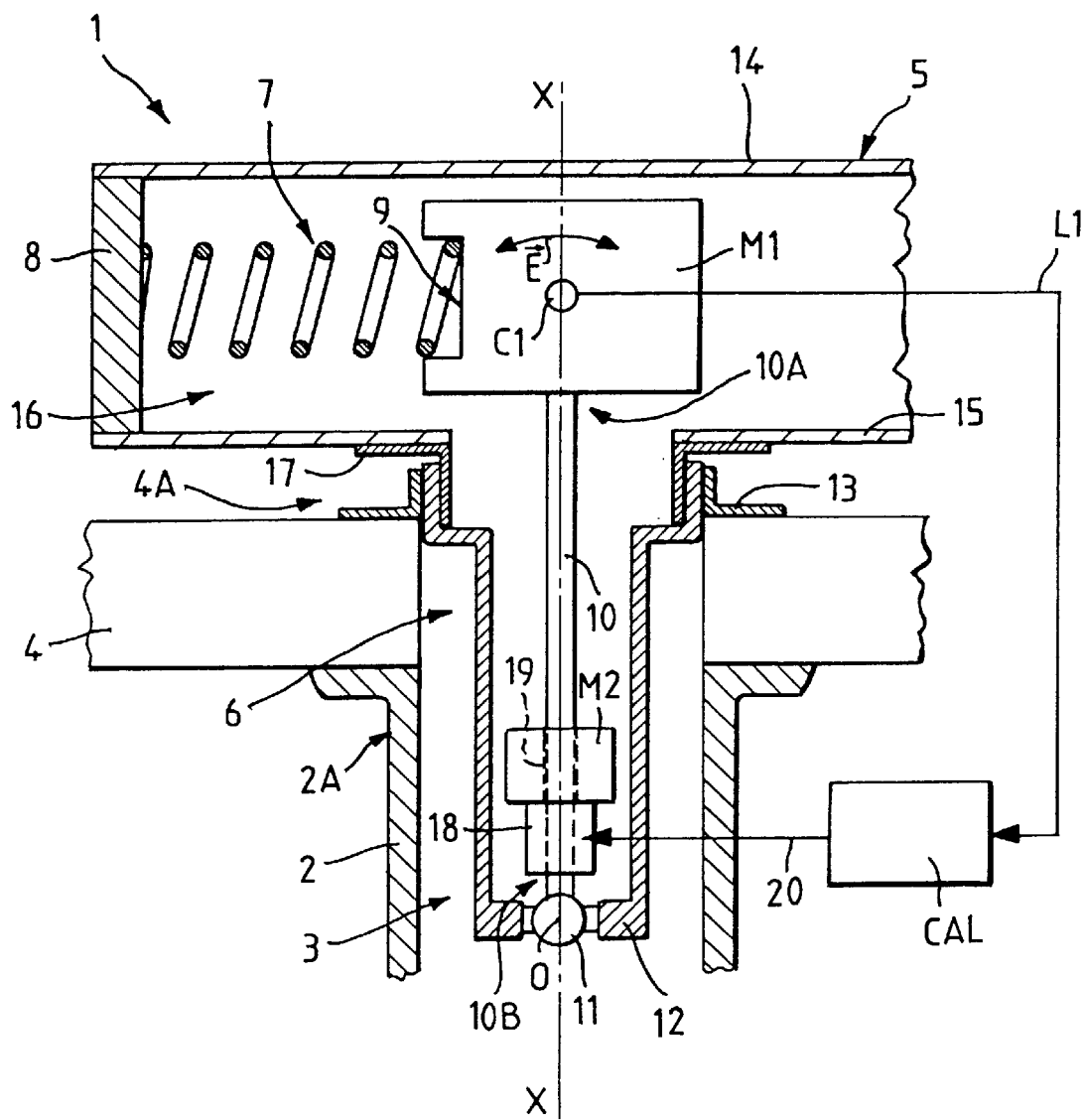

United States Patent [19]
Krysinsky et al.

[11] Patent Number: 6,045,090
[45] Date of Patent: Apr. 4, 2000

[54] DEVICE FOR REDUCING THE VIBRATIONS GENERATED BY A LIFT ROTOR OF A ROTARY-WING AIRCRAFT

[75] Inventors: Thomasz Krysinsky, Marseille; Michel Francois Anthoine, Aix En Provence, both of France

[73] Assignee: Eurocopter, Marignane Cedex, France

[21] Appl. No.: 08/873,696

[22] Filed: Jun. 12, 1997

[30] Foreign Application Priority Data

Jun. 12, 1996 [FR] France .................................. 96 07280

[51] Int. Cl.$^7$ .................................................. B64C 27/06
[52] U.S. Cl. .................................. 244/17.27; 244/17.25; 74/155; 188/378
[58] Field of Search ........................... 244/17.25, 17.27; 188/378, 379, 380; 74/155; 416/500, 145

[56] References Cited

U.S. PATENT DOCUMENTS

| | | |
|---|---|---|
| 1,482,690 | 2/1924 | Lanzius . |
| 2,451,541 | 10/1948 | Doman . |
| 4,255,084 | 3/1981 | Mouille et al. . |
| 4,596,513 | 6/1986 | Carlson et al. . |
| 4,819,182 | 4/1989 | King et al. . |
| 5,647,726 | 7/1997 | Sehgal et al. . |

FOREIGN PATENT DOCUMENTS

| | | |
|---|---|---|
| 0206348 | 12/1986 | European Pat. Off. . |
| 0369500 | 2/1995 | European Pat. Off. . |
| 2363737 | 3/1978 | France . |
| 2416839 | 9/1979 | France . |
| 2056164 | 5/1972 | Germany . |
| 48403 | 3/1984 | Japan ..................................... 188/378 |
| 2014099 | 8/1979 | United Kingdom . |
| 2087033 | 5/1982 | United Kingdom . |
| 2160840 | 1/1986 | United Kingdom ................. 244/17.27 |

OTHER PUBLICATIONS

Patent Abstracts of Japan vol. 11, No. 135 (M–585), 28 Avril 1987 & JP 61–274134 A (Mitsubishi Heavy Ind Ltd), Dec. 4, 1986.

*Primary Examiner*—Charles T. Jordan
*Assistant Examiner*—Tion Dinh
*Attorney, Agent, or Firm*—Stevens, Davis, Miller & Mosher, L.L.P.

[57] ABSTRACT

The present invention relates to a device for reducing the vibrations of the rotor of a rotary-wing aircraft, having an oscillating mass (M1), elastically held radially on the hub (4) of the rotor in the vicinity of its axis (X-X) and fixed to an articulated rod (10) substantially longitudinal to said axis (X-X).

According to the invention, said device includes:

- an adjustment oscillating mass (M2), mounted so that it can move on the rod (10) and having an adjustment position for which the frequency of the resonator formed by said oscillating masses (M1, M2) is matched to the frequency of said vibrations; and
- drive means (18) for bringing the adjustment oscillating mass (M2) into said adjustment position.

16 Claims, 4 Drawing Sheets

DEVICE FOR REDUCING THE VIBRATIONS GENERATED BY A LIFT ROTOR OF A ROTARY-WING AIRCRAFT

The present invention relates to a device for educing the vibrations generated by a lift rotor of a rotary-wing aircraft.

It is known that the blades of a rotary-wing aircraft, in particular of a helicopter, are subjected to periodic alternating forces, in flapping and circumferentially. These forces cause stresses and reactions in the hub of the rotor, and in particular bending and torsional moments applied to the shaft of the rotor.

These alternating stresses and the reactions of the hub are repeated regularly on each revolution of the rotor and induce, in particular through the shaft of the rotor, the suspension bars and the casing of the main gearbox, essentially horizontal and vertical vibrations which are propagated throughout the fuselage and are, in particular, very substantial in the cockpit of the aircraft.

The vibrations thus generated are particularly problematic since they can, in particular, limit the maximum speed of the aircraft, weaken its structural strength and impair the comfort of the occupants of the aircraft.

French Patent No. 2 416 838 of the Applicant Company discloses a device which can effectively reduce problematic vibrations of this type. To this end, said device has a main oscillating mass mounted at the upper part of the hub of the rotor, held radially by elastic means in the vicinity of the axis of the rotor and fixed to the upper end of a rod which is arranged in a central recess provided in the upper part of the shaft of the rotor, substantially longitudinal to the axis of said rotor, and which is articulated at its lower end, at a point situated on the axis about a direction orthogonal to said axis.

As a consequence, the oscillating mass of this known device directly counteracts the vibrations generated by the rotor, by acting on the actual source of these vibrations. To this end, its natural frequency, which has a constant value and depends on its mass and on the stiffness of said elastic means, is matched, at the time of production, to the excitation frequency of the vibrations to be reduced.

This known device is therefore particularly effective so long as the excitation frequency of the vibrations to be reduced varies little and remains close to the constant natural frequency of said oscillating mass.

However, when a variation in the excitation frequency of said vibrations leads to a significant divergence between these two frequencies, said known device becomes largely ineffective since its natural frequency cannot be modified and matched to such variable frequencies of the vibrations of the rotor.

The present invention has the object of overcoming this drawback, and relates to an improvement to the known vibration-reduction device mentioned above, in order to make it effective in simple and inexpensive fashion against vibrations of the rotor at variable excitation frequencies.

To this end, according to the invention, said vibration-reduction device includes, in addition to the aforementioned elements:

an adjustment oscillating mass, mounted so that it can move on said rod and capable of being brought into and kept in an adjustment position for which the natural frequency of the resonator assembly formed by said main oscillating mass and said adjustment oscillating mass is matched to the frequency of said vibrations of the rotor to be reduced; and drive means, for example a motor or an actuator, for bringing said adjustment oscillating mass into said adjustment position and for keeping it in this adjustment position.

Thus, by virtue of the invention, said vibration-reduction device can be matched with ease to vibrations having variable excitation frequencies, simply by bringing the adjustment oscillating mass into the appropriate adjustment position on said articulated rod, since the natural frequency of the resonator assembly formed by said main oscillating mass and said adjustment oscillating mass depends on the position of the adjustment oscillating mass along said articulated rod.

In addition, said device according to the invention can be produced in simple fashion and at low cost.

Advantageously, said adjustment oscillating mass is made of a dense material, in the form of a cylinder which is provided with a cylindrical and coaxial through-hole through which said rod can pass.

In addition, in order to allow automatic matching to vibrations having variable frequencies, the device according to the invention advantageously also includes:

at least one sensor, preferably an accelerometer, a velocimeter, a displacement sensor or a strain gage, capable of measuring the values of at least one parameter representing the vibrations generated by the rotor; and a computer, receiving the values measured by said sensor, determining as a function of these values the adjustment position of said adjustment oscillating mass, as well as the control commands for said drive means to move said adjustment oscillating mass into said adjustment position, and addressing to said drive means the control commands thus determined.

Advantageously, in a first embodiment of the device according to the invention, including a plurality of sensors, at least a first of said sensors is mounted on the head of the rotor, in order to measure a horizontal acceleration, and at least a second of said sensors is mounted on said main oscillating mass, also in order to measure a horizontal acceleration.

What is more, in a second embodiment, said device includes one or more sensors arranged:

on the fuselage of the aircraft;

on the main gearbox of the aircraft; and/or on the interface between the main gearbox and the fuselage of the aircraft.

In addition, in a first way of implementing the invention, for vibrations of the rotor having frequency F, the computer advantageously defines as the adjustment position, on the rod, the position of the adjustment oscillating mass for which its center of gravity is situated, on said rod, at a distance z from the articulated lower end of the rod, said distance z satisfying the expression:

$$z = L \cdot \sqrt{\frac{m}{\mu}} \cdot \sqrt{\left(\frac{K}{m \cdot F^2}\right) - 1}$$

in which:

L is the distance between the center of gravity of the main oscillating mass and said articulated lower end of the rod;

m represents the mass of the main oscillating mass;

$\mu$ represents the mass of the adjustment oscillating mass; and

K represents the stiffness of the elastic means holding the main oscillating mass radially in proximity to the axis of the rotor.

To this end, according to the invention, said computer may determine said frequency F of the vibrations of the rotor on the basis of the various measurements, in particular accelerometric measurements, taken by the sensor or sensors used.

However, in a preferred embodiment, use is made of a sensor which, for example, is connected to a phonic wheel mounted in proximity to the rotor and which detects the rotational speed Ω of said rotor, said rotational speed Ω making it possible directly to determine the frequency F of the vibrations to be reduced of the rotor, by the expression F=b.Ω, b being the number of blades of said rotor.

It is known that, in particular because of the structure of a helicopter, the frequency curve of the vibrations is often not the same in the cockpit of the aircraft as at the rotor. Thus, when the desire is above all to reduce the vibrations generated in the cockpit, in particular in order to make the aircraft more comfortable to fly, use is made of a second way of implementing the invention that is appropriate to this purpose.

According to this second way of implementing the invention, in order to determine the adjustment position of the adjustment oscillating mass, said computer advantageously moves said adjustment oscillating mass successively along said rod, in order to determine the position that makes it possible to minimize the overall vibrational level in the cockpit of the aircraft, said overall vibrational level NVG being defined by the expression:

$$NVG = \sqrt{\frac{\Gamma1^2 + \Gamma2^2 + \ldots + \Gamma n^2}{n}}$$

in which:

Γ1 to Γn are accelerations measured in said cockpit; and
n is the number of different accelerations measured, the position thus determined representing the adjustment position of the adjustment oscillating mass.

The figures of the appended drawing will clearly show how the invention may be embodied. In these figures, identical references denote similar elements.

FIG. 1 schematically shows a device according to the invention.

Figure 2:
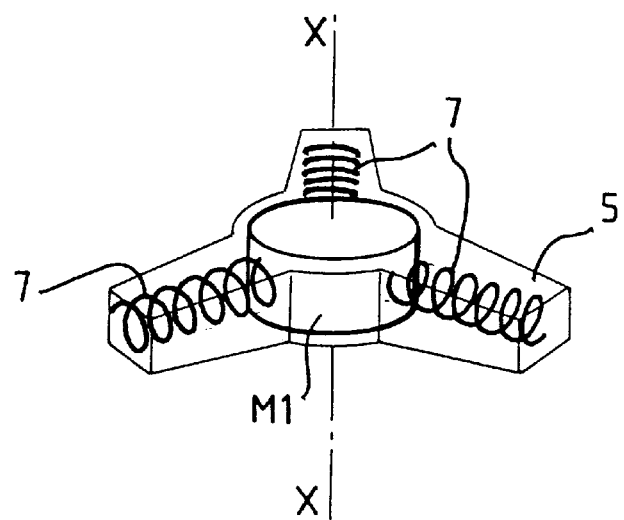

FIG. 2 schematically shows the upper part of the device according to the invention.

Figure 3:
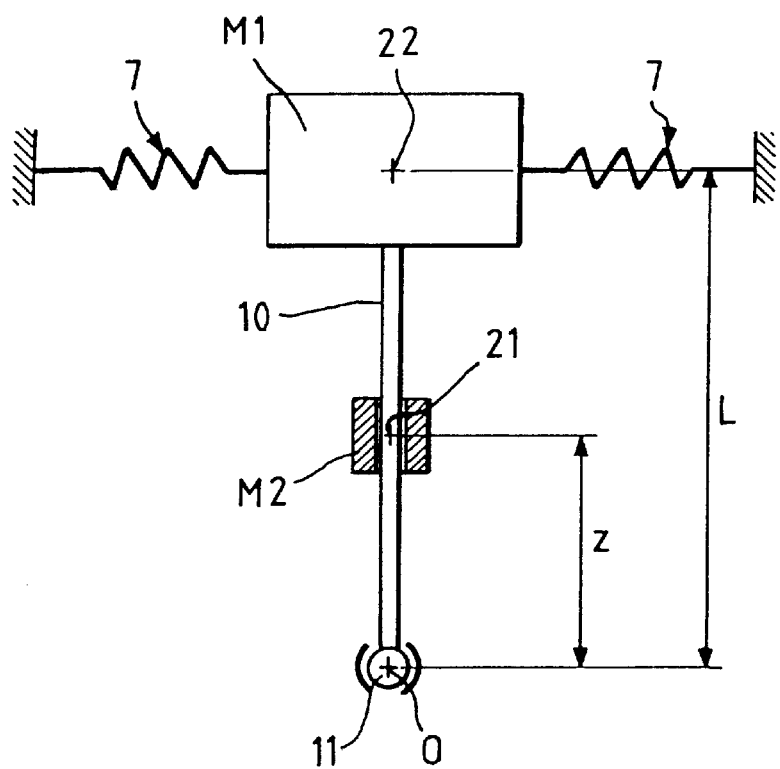

FIG. 3 schematically illustrates the mode of operation of the device according to the invention.

Figure 4:
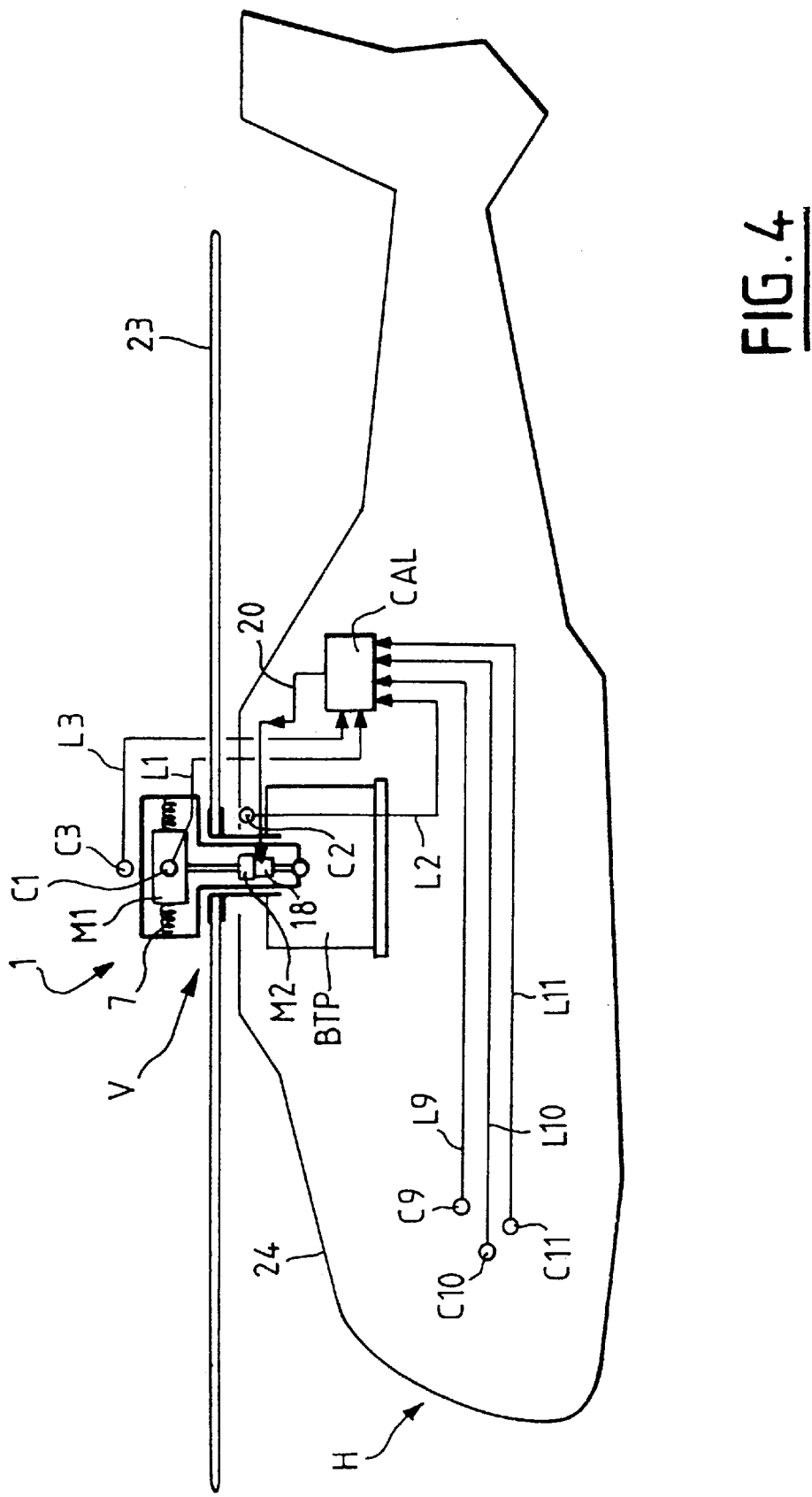

FIG. 4 schematically shows the arrangement of a device according to the invention on a rotary-wing aircraft, simultaneously illustrating three different embodiments.

Figure 5:
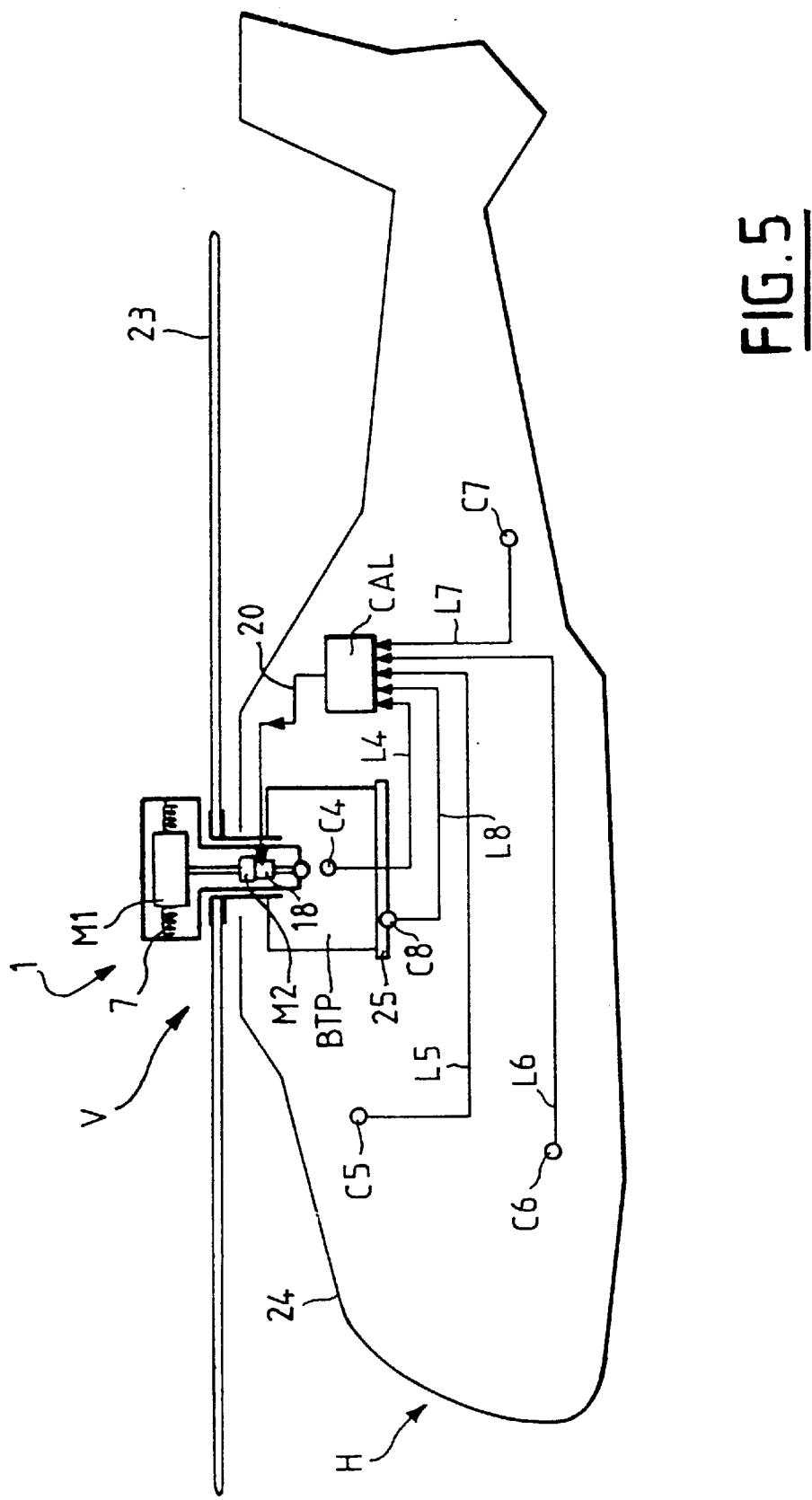

FIG. 5 schematically shows the arrangement of a device according to the invention on a rotary-wing aircraft, in a fourth embodiment.

The device 1 according to the invention, represented schematically in FIG. 1, is mounted on a rotary-wing V aircraft H, for example a helicopter, and is intended to reduce the vibrations generated by the rotor forming said rotary wing V, of which the driveshaft 2 has been represented partially in FIG. 1, said shaft 2, of axis X-X, being provided with a cylindrical central recess 3, at least in its upper part 2A.

To this end, said device 1 is of the known type, having a main oscillating mass M1 which is:

mounted at the upper part 4A of the hub 4 of said rotor in a support assembly 5 specified below. Said hub 4, which is fixed in known fashion by means (not shown) to the shaft 2 of the rotor, is provided with a cylindrical central recess 6 which has the same diameter as the recess 3 of the shaft 2 and is coaxial therewith;

held radially by elastic means 7, preferably coil springs, in the vicinity of the axis X-X of the shaft 2. To this end, said elastic means 7, which are arranged in a plane orthogonal to the axis X-X, respectively each bear, on the one hand, on stop 8 of the support assembly 5 and, on the other hand, on correspondingly recessed opposite faces 9 of the main oscillating mass M1; and fixed to the upper part 10A of a rod 10.

Said rod 10 is, for its part:

arranged in the recess 3 of the shaft 2 of the rotor, passing through the recess 6 of the hub;

arranged substantially longitudinal to the axis X-X of the shaft 2; and articulated at its lower end 10B by means of a ball joint 11 which is held by a support 12.

Said ball joint 11 is centered on the axis X-X at a point O, and allows the rod 10 to be articulated about a direction orthogonal to said axis X-X (said orthogonal direction passing through said point O and being orthogonal to the plane of FIG. 1).

In addition, the support 12 is produced in the form of a drum, surrounding said rod 10 and fixed by known means (not shown) to a collar 13 which is secured to the hub 4 at its upper part 4A.

Said support 12 is intended both to center the rod 10 on the axis X-X and to articulate it by means of the ball joint 11.

What is more, said support assembly 5 has the shape of a three-pointed star, as represented in FIG. 2, preferably with a shape matched to that of the hub 4. Each of the arms of this star, which are offset to each other by 120°, serves to house elastic means 7. Within the scope of the present invention, said support assembly 5 may, of course, have a different number of arms.

In known fashion, as can be seen in FIG. 1, said support assembly 5 is formed by an upper plate 14 and a lower plate 15, which are separated from each other by supports 8 which are produced in the form of spacer pieces and which are fixed on them by means (not shown) in such a way as to form a space 16 for said main oscillating mass M1 and said elastic means 7.

This support assembly 5 is also fixed on the support 12, and therefore the hub 4, by means of a collar 17.

The main oscillating mass Ml can thus oscillate slightly in a plane (not shown) substantially orthogonal to the axis X-X, as indicated by a double arrow $\vec{E}$.

When the rotor of the aircraft H rotates and generates vibrations, said main oscillating mass M1 consequently oscillates in said aforementioned orthogonal plane so as to counteract the vibrations of the rotor. The inertial force of said main oscillating mass M1 then compensates for the excitation force generated by the rotor.

The device 1, formed in the manner described above and corresponding to the device described in French Patent No. 2 416 838 of the Applicant Company, is particularly effective when its natural frequency, which is defined in known fashion on the basis of the stiffness of said elastic means 7 and the mass of said main oscillating mass M1, is matched to the excitation frequency of the vibrations to be reduced which are generated by the rotor.

However, drawbacks occur when the vibrations to be reduced have variable excitation frequencies, for which the device is not designed.

Thus, to make said device 1 effective against vibrations having variable frequencies, according to the invention this device includes, in addition to the aforementioned elements, as represented in FIG. 1:

an adjustment oscillating mass M2, mounted so that it can move on said rod 10 and capable of being brought into and kept in an adjustment position for which the natural frequency of the resonator assembly formed by said main oscillating mass M1 and said adjustment oscillating mass M2, which natural frequency depends on the position of the adjustment oscillating mass M2 along said rod 10, is matched to the frequency of said vibrations to be reduced; and drive means 18, for example an actuator or a motor, for bringing said adjustment oscillating mass M2 into said adjustment position and for keeping it in this adjustment position.

Thus, by suitably positioning the adjustment oscillating mass M2 on said rod 10, the natural frequency of the device 1 can be adjusted with ease and effectively, and it can therefore be matched at any time to the frequencies of the vibrations to be reduced.

According to the invention, said adjustment oscillating mass M2 is made of a dense material, in the form of a cylinder which is provided with a cylindrical and coaxial through-hole 19 through which said rod 10 can pass.

In one particular embodiment, said hole 19 may, in particular, have a screw-thread (not shown) intended to interact with corresponding screw-thread (also not shown) of the rod 10.

What is more, according to the invention, in order to make it possible for the device 1 to be frequency-matched automatically, said device 1 also includes:

sensors C1, C2, C3, ... capable of measuring the values of at least one parameter, specified below, representing the vibrations to be reduced of the rotor; and a computer CAL, connected via links L1, L2, L3, ... to said sensors C1, C2, C3, ..., receiving the values measured by said sensors C1, C2, C3, ..., determining, in real-time and as a function of the received values, on the one hand the adjustment position of the adjustment oscillating mass M2 and, on the other hand, control commands for the drive means 18 to bring said adjustment oscillating mass M2 into said adjustment position, and addressing the control commands thus determined, to said drive means via a link 20.

According to the embodiment envisaged, said sensors C1, C2, C3, ... may, in particular, be accelerometers, velocimeters, displacement sensors and/or strain gages.

According to the invention, for vibrations of frequency F, the computer CAL defines as the adjustment position of the adjustment oscillating mass M2, the position for which the center of gravity 21 of said adjustment oscillating mass M2 is situated, as represented in FIG. 3, at a distance z from the point O, that is to say from the articulated lower end 10B of said rod 10, said distance z satisfying the expression:

$$z = L \cdot \sqrt{\frac{m}{\mu}} \cdot \sqrt{\left(\frac{K}{m \cdot F^2}\right) - 1}$$

in which:

L is the distance between the center of gravity 22 of the main oscillating mass M1 and said point O;

m represents the mass of the main oscillating mass M1;

$\mu$ represents the mass of the adjustment oscillating mass M2; and

K represents the stiffness of the elastic means 7.

To this end, said frequency F may be determined by the computer CAL on the basis of measurements, in particular accelerometric measurements, taken by said sensors.

However, in a preferred embodiment, allowing simplified implementation of the invention, use is made of a sensor C2 (represented in FIG. 4) which detects the rotational speed $\Omega$ of said rotor, which makes it possible directly to determine said frequency F of the vibrations to be reduced of the rotor, by the expression $F = b \cdot \Omega$, b being the number of blades 23 of said rotor. Indeed, it is known that the blades 23 of the rotor are subjected to periodic alternating forces, in flapping and circumferentially, which cause stresses and reactions in the hub 4. These alternating stresses and the reactions of the hub are repeated regularly on each revolution of the rotor and for each blade 23. Their frequency is therefore equal to $b\Omega$.

In this case, said sensor C2 may be formed in such a way as to detect the signal emitted, if appropriate, by a phonic wheel mounted in proximity to the shaft 2 of the rotor.

In another embodiment (also represented in FIG. 4) a first sensor C3 is mounted on the head of the rotor, in order to measure a horizontal acceleration, and a second sensor C1 is mounted on the main oscillating mass M1, also in order to measure a horizontal acceleration. Said computer CAL then determines the adjustment position and the control commands for the drive means 18 on the basis of the measurements taken by these sensors C1 and C3.

What is more, in an additional embodiment represented in FIG. 5, sensors are mounted:

on the main gearbox BTP of the aircraft H, for example the sensor C4;

on the fuselage 24 of the aircraft H, for example the sensors C5 to C7; and/or on the interface 25 between the main gearbox BTP and the fuselage 24, for example the sensor C8.

It is known that the frequency curve of the vibrations is often not the same in the cockpit as at the rotor. Thus, when the desire is essentially to reduce the vibrations generated in the cockpit, use is made of an appropriate way of determining the adjustment position of the adjustment oscillating mass M2, which method is specified below.

In this case, according to the invention, said computer CAL successively moves said adjustment oscillating mass M2 along said rod 10, in order to determine a position making it possible to minimize the overall vibrational level in the cockpit of the aircraft H, said overall vibrational level NVG being defined by the expression:

$$NVG = \sqrt{\frac{\Gamma 1^2 + \Gamma 2^2 + \ldots + \Gamma n^2}{n}}$$

in which:

$\Gamma 1$ to $\Gamma n$ are accelerations measured, for example by the sensors C9 to C11 shown in FIG. 4, in said cockpit; and n is the number of different accelerations measured, the position thus determined representing the adjustment position of the adjustment oscillating mass M2.

To do this, the following operations are, more precisely, performed:

an arbitrary movement of the adjustment oscillating mass M2 is effected along the rod 10;

the accelerations $\Gamma 1$ to $\Gamma n$ are measured;

the overall vibrational level NVG is calculated and recorded on the basis of these measurements; then repeatedly:

a new movement in a determined direction is effected;
the accelerations Γ1 to Γn are measured;
the current overall vibrational level NVG is calculated;
said current overall vibrational level NVG is compared with the recorded overall vibrational level;
and
depending on this comparison:
if the current overall vibrational level is lower, said current overall vibrational level is recorded in place of the overall vibrational level previously recorded, and a new movement of the adjustment oscillating mass M2 is effected in the same direction as before;
if not, a new movement of the adjustment oscillating mass M2 is effected in the opposite direction;
these repeated operations being reiterated until the difference between two successive overall vibrational levels NVG, calculated and compared, is less than a predetermined threshold, the position then obtained for the adjustment oscillating mass M2 representing the adjustment position which is used.

We claim:

1. A device for reducing the vibrations generated by a lift rotor of a rotary-wing aircraft, said rotor having a shaft which, at least in its upper part comprises a central recess, and said device comprising a main oscillating mass, mounted at an upper part of a hub of said rotor, held radially by elastic means in the vicinity of axis (X-X) of the rotor and fixed to an upper end of a rod which is arranged in said central recess of the shaft of the rotor, substantially longitudinal to the axis (X-X) of said rotor, and which is articulated at its lower end, at a point situated on said axis (X-X) about a directional orthogonal to said axis (X-X), said device further comprises:
an adjustment oscillating mass, mounted so that it can move on said rod and for being brought into and kept in an adjustment position for which the natural frequency of a resonator assembly formed by said main oscillating mass and said adjustment oscillating mass is matched to the frequency of said vibrations of the rotor to be reduced; and
drive means for bringing said adjustment oscillating mass into said adjustment position and for keeping it in this adjustment position.

2. The device as claimed in claim 1, wherein said adjustment oscillating mass is made of a dense material, in a form of a cylinder which is provided with a cylindrical and coaxial through-hole through which said rod can pass.

3. The device as claimed in claim 1, wherein said drive means comprise a motor.

4. The device as claimed in claim 1, wherein said drive means comprise an actuator.

5. The device as claimed in claim 1, further comprising:
at least one sensor for measuring values of at least one parameter representing the vibrations generated by the rotor; and
a computer, receiving the values measured by said sensor, determining as a function of these values the adjustment position of said adjustment oscillating mass, as well as control commands for said drive means to move said adjustment oscillating mass into said adjustment position, and addressing to said drive means the control commands thus determined.

6. The device as claimed in claim 5, wherein said sensor is an accelerometer.

7. The device as claimed in claim 5, wherein said sensor is a velocimeter.

8. The device as claimed in claim 5, wherein said sensor is a displacement sensor.

9. The device as claimed in claim 5, wherein said sensor is a strain gage.

10. The device as claimed in claim 5, wherein said at least one sensor comprises a plurality of sensors, wherein at least a first of said sensors is mounted on a head of the rotor, in order to measure a horizontal acceleration, and wherein at least a second of said sensors is mounted on said main oscillating mass, also in order to measure a horizontal acceleration.

11. The device as claimed in claim 5, wherein said sensor is mounted on a fuselage of the aircraft.

12. The device as claimed in claim 5, wherein said sensor is mounted on a main gearbox of the aircraft.

13. The device as claimed in claim 5, wherein said sensor is mounted on an interface between a main gearbox and a fuselage of the aircraft.

14. The device as claimed in claim 5, wherein, for said vibrations to be reduced having frequency F, the computer defines as the adjustment position, on the rod the position of the adjustment oscillating mass for which its center of gravity is situated, on said rod, at a distance z from the articulated lower end of the rod, said distance z satisfying the expression:

$$z = L \cdot \sqrt{\frac{m}{\mu}} \cdot \sqrt{\left(\frac{K}{m \cdot F^2}\right) - 1}$$

in which:
L is the distance between the center of gravity of the main oscillating mass and said articulated lower end of the rod;
m represents a mass of the main oscillating mass;
$\mu$ represents a mass of the adjustment oscillating mass; and
K represents a stiffness of the elastic means holding the main oscillating mass radially in proximity to the axis (X-X) of the rotor.

15. The device as claimed in claim 14, wherein said sensor detects a rotational speed $\Omega$ of said rotor, which makes it possible directly to determine the frequency F of the vibrations to be reduced of the rotor, by the expression F=b.$\Omega$, b being a number of blades of said rotor.

16. The device as claimed in claim 5, wherein, in order to determine the adjustment position of the adjustment oscillating mass, said computer moves said adjustment oscillating mass successively along said rod, in order to determine a position that makes it possible to minimize an overall vibrational level in a cockpit of the aircraft, said overall vibrational level NVG being defined by the expression:

$$NVG = \sqrt{\frac{\Gamma 1^2 + \Gamma 2^2 + \ldots + \Gamma n^2}{n}}$$

in which:
Γ1 to Γn are accelerations measured in said cockpit; and
n is the number of different accelerations measured, the position thus determined representing the adjustment position of the adjustment oscillating mass.

* * * * *